Jan. 5, 1965  H. B. W. HOLT ETAL  3,164,755
INSTRUMENT FOR THE SENSING OF TEMPERATURE
Filed May 31, 1961  4 Sheets-Sheet 4
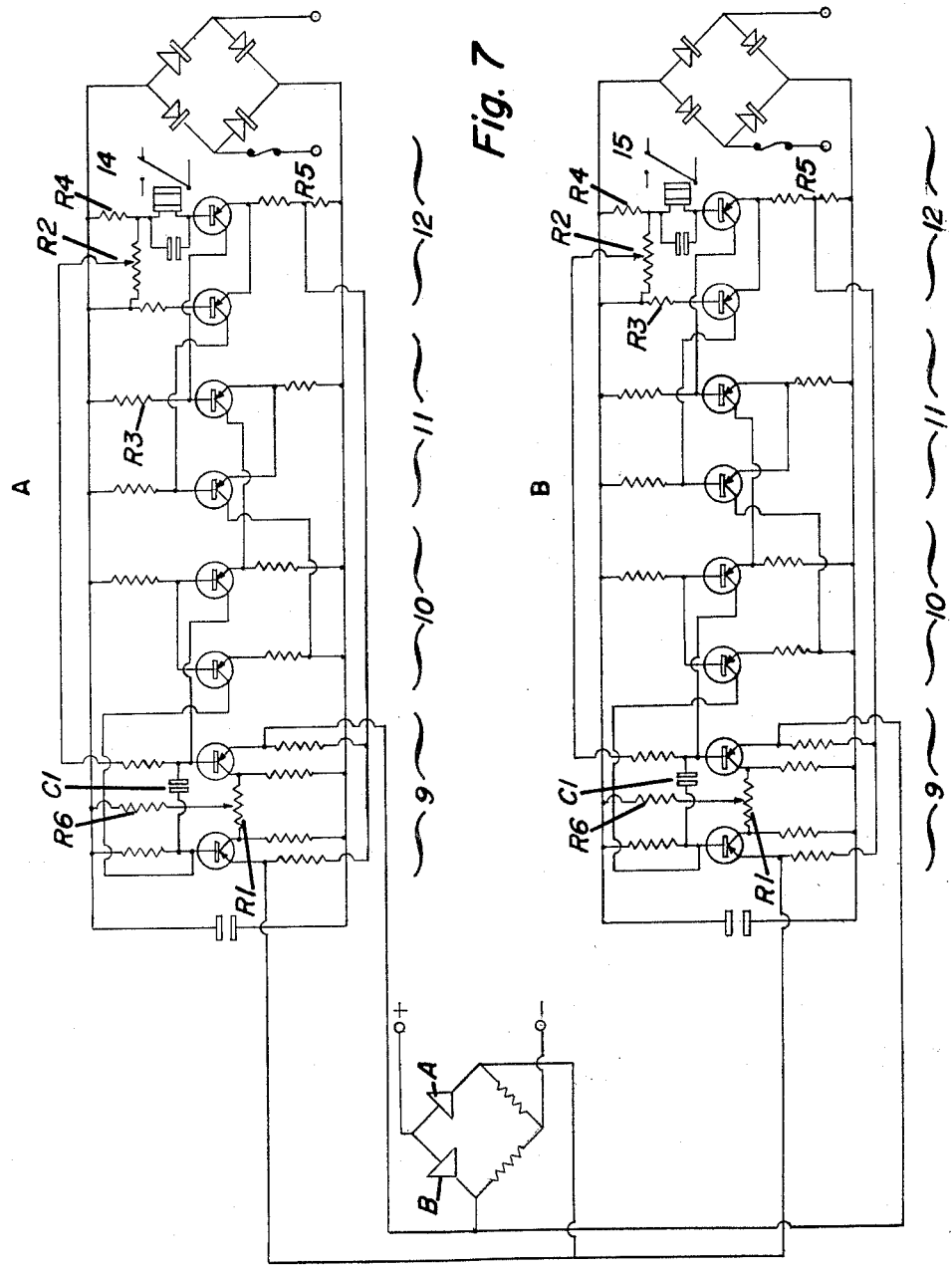
INVENTORS
HERBERT B. W. HOLT
PETER D. SAW
BY
ATTORNEY

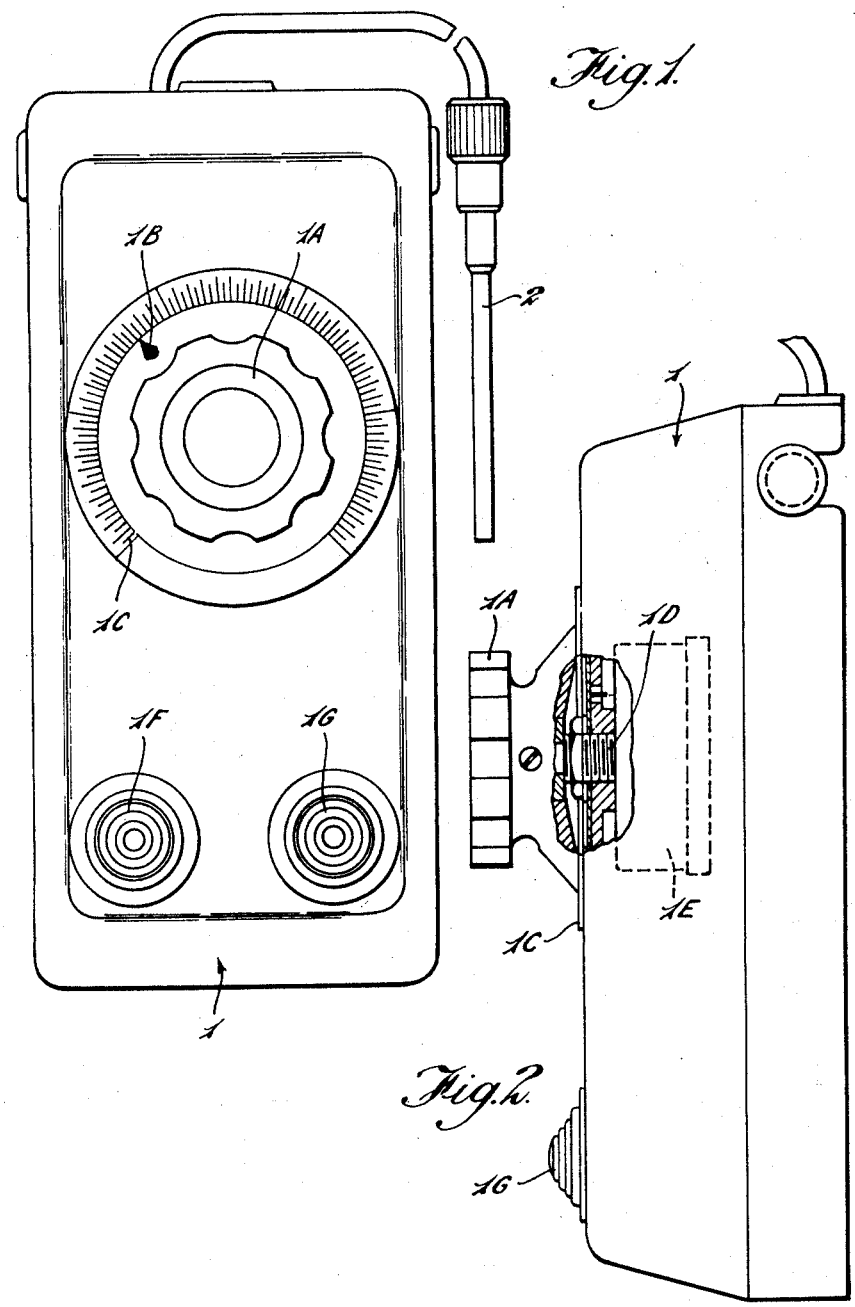

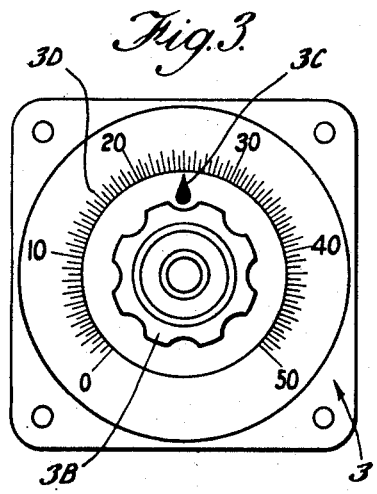
Fig. 3.
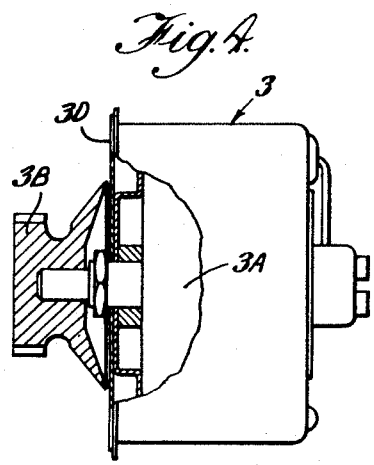
Fig. 4.
CENTIGRADE
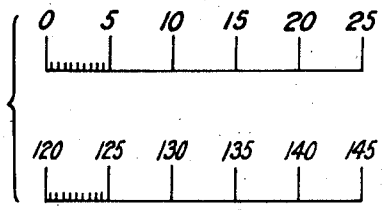
FAHRENHEIT
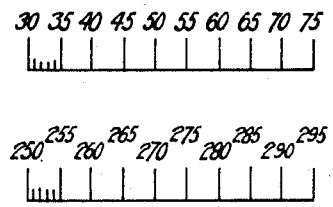
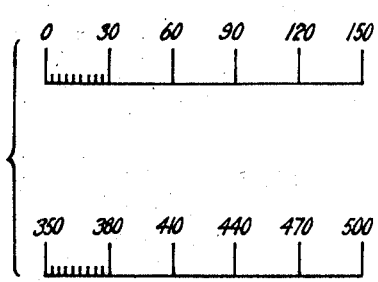
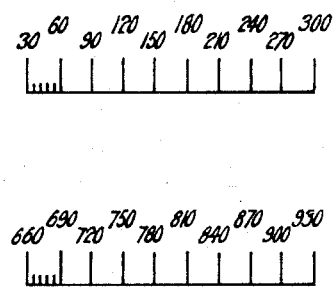
Fig. 6.

United States Patent Office 3,164,755
Patented Jan. 5, 1965

3,164,755
INSTRUMENT FOR THE SENSING OF
TEMPERATURE
Herbert Bruce William Holt, Surbiton, and Peter Doree
Saw, Staines, England, assignors to Tyer and Company
Limited, Guildford, England, a British company
Filed May 31, 1961, Ser. No. 113,866
6 Claims. (Cl. 317—153)

This invention relates to an instrument for the sensing of temperature.

Electrically operated instruments for the control of temperature are known. In one such type of instrument, use is made of the output voltage of a thermocouple which operates a millivolt meter to register a temperature. For small changes of temperature, the corresponding voltage change is very small indeed, necessitating a very sensitive millivolt meter. Further, in such an instrument it is difficult to use the small voltages concerned to operate a relay.

In another such type of instrument, the change of electrical resistance of metals such as nickel or platinum, when heated, is utilised to effect corresponding current changes which are registered by a meter. In order to obtain reliable readings from the instrument, it is necessary that the voltage of the supply energising the instrument should be constant.

The object of this invention is to provide an instrument for the sensing of temperature, the instrument being of the resistance type, but which is independent of the voltage of the power source to the instrument, sensitive to very small changes in temperature and which is robust and reliable in operation.

According to this invention there is provided an instrument for the control of temperature wherein one resistance of a Wheatstone bridge comprises a temperature sensing element, and wherein another resistance of the bridge is manually adjustable to balance the bridge at the required temperature, deviations from the required temperature unbalancing the bridge so that voltages are set up across the bridge which voltages are used to operate temperature regulating means, characterised in this, that the bridge includes an adjustable pre-set resistance whereby the range of temperatures controlled by the instrument may be varied.

In order that the invention may be clearly understood it will now be described more fully, by way of example, with reference to the accompanying drawings, in which:

FIGURE 1 is a front elevation of an instrument in accordance with the invention;

FIGURE 2 is a side elevation with a part of the case broken away;

FIGURE 3 is a front elevation of a remote regulator for use with the instrument;

FIGURE 4 is a side elevation partly broken away;

FIGURE 6 shows examples of different ranges of temperature within which the instrument may be set to operate, and FIGURE 7 is a circuit diagram of a modification wherein two amplifiers are connected to a single bridge.

Figure 5:
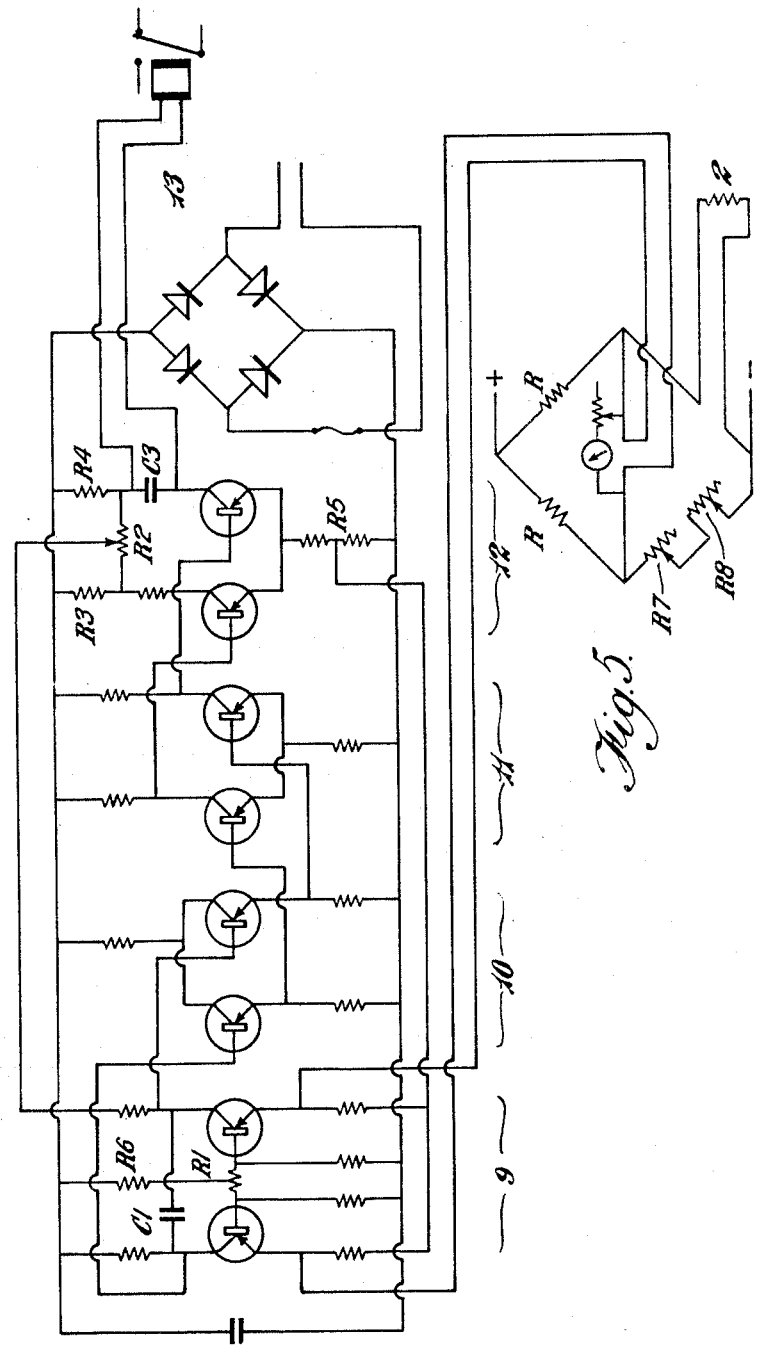
FIGURE 5 is a circuit diagram of the instrument.

Referring to the drawings, the instrument may be housed in a case 1 adapted to be attached to a fixture, and furnished with a control knob 1A. The knob has a skirt on which is marked an arrow 1B which moves over a stationary scale 1C having divisions according to the range of temperature within which the instrument is intended to operate as will be described later. The knob has a short spindle 1D which projects into the case and which actuates a potentiometer 1E of a well known type. The resistance value of the potentiometer is determined by the temperature range over which the instrument is intended to operate as will be made clear later. The potentiometer constitutes one arm of a Wheatstone bridge.

Another variable arm of the bridge forms the sensing probe indicated at 2. This may be of a known type comprising a platinum resistance bulb.

The bridge circuit, apart from the potentiometer and the resistance carried by the sensing probe 2, constitutes a unit comprising a rectifier, resistances and a smoothing capacitor. These components may be built on a printed panel circuit which may be plugged into a socket member. The case may also mount pilot lamps 1F and 1G for indicating "Supply on" and "Relay operation," respectively.

Since the out-of-balance potentials developed across the bridge when the temperature sensed by the probe is above or below the value set by the knob 1A are of the order of 0.4 millivolt for differences of 0.1° C., it is necessary to use an amplifier in order that sufficient current is available to actuate a relay 13 for operating the regulating means. The components of the amplifier may be built on a printed circuit panel adapted to be plugged into a socket member within the case, the case also housing the relay and a mains transformer.

In certain circumstances it may be required that the control knob and the potentiometer it operates should be remote from the rest of the instrument and forms a separate regulating unit as shown in FIGURES 4 and 5. The unit comprises a case 3 which contains a potentiometer 3A the spindle of which is operated by a knob 3B having a skirt on which is marked an arrow 3C which reads against a fixed scale 3D. It is to be understood that in this form of the instrument the knob and scale will be omitted from the case housing the electrical components.

A suitable amplifier for use with the instrument is shown in FIGURE 5. In the circuit transistors are arranged in four balanced push-pull stages 9, 10, 11 and 12, the relay 13 being connected in series with the collector of one of the transistors in the last stage 12. For the positive operation of the relay, it is desirable that the slightest cooling of the sensing probe 2 shall produce a change of current in the relay coil from zero to the maximum permitted by the circuit components and to ensure that this is achieved, a special form of feed-back is introduced in the circuit.

Connected across two load resistors R3 and R4 in the collector circuits of the two transistors of the last stage 12 is a potentiometer R2. At a point near the centre position of the potentiometer slider no voltage change will occur when varying potentials are applied to the input of the circuit, but on either side of the point small potentials of one polarity or the other will be set up. The slider of the potentiometer is connected to feed the collector load of one of the transistors in the input stage and the adjustment of the potentiometer slider to either side of the no volts position effectively produces positive or negative feed-back. The effect of positive feed-back is that a strong tendency is produced in the circuit to hold-over in a position to maintain the current in the emitter of the output transistor which current was increased by the change of potential effected by the bridge. The use of varying degrees of positive feed-back enables an adjustable differential in the relay operation to be achieved.

This is a desirable feature since the sensitivity of the circuit can be reduced whilst a positive action of the relay is maintained.

In order to offset drift which may occur in the transistors due to ageing or heating, a substantially 100% negative D.C. feed-back in phase is incorporated in the circuit. The feed-back voltage is taken from a resistor R5 in the common emitter circuit of the last amplifier stage and is applied to the emitters of the first amplifying pair of transistors. A capacitor C1 may be connected across the collectors of the two transistors of the first stage 9 in order to minimise hum pick-up.

For the calibration of the instrument so that the relay will switch when the sensing resistance is the same as that indicated on the scale by a predetermined amount, the balancing potentiometer is adjusted to unbalance the first amplifier stage sufficiently to produce the required difference. Balancing may be effected by a potentiometer R1 connected between the bases of the first pair of transistors, the slider of the potentiometer being connected to the negative line of the circuit via a resistor R6.

For certain special applications of the instrument, it is convenient to use two amplifiers, indicated generally at A and B in FIGURE 7. The amplifiers may be similar to that previously described and are connected to a common bridge V3 one arm of which is constituted by the sensing probe 2. The amplifiers A and B actuate relays 14 and 15 respectively. It may be required to arrange that one relay operates at a slightly different temperature from the other so that a part of the heating energy can be switched off before the required working temperature is reached and the remaining heating load switched by the other relay when the working temperature is achieved. It is possible to upset, within small limits, the balance of the input stage of one of the two amplifiers so that its relay operates at a lower temperature than the other by adjustment of the balance potentiometer R1 connected across the bases of the two transistors of the first stage of the amplifier.

The whole amplifier may be built as a printed circuit panel with its own rectifier, smoothing capacitor and a capacitor which provides a slight slugging of the relay. In order to facilitate servicing, the panel may be plugged into a socket fitting mounted within the case 1.

It is clear that instruments can be produced with adjustment range spans either large or small and covering portions of the temperature spectrum as may be most suitable for particular purposes. For example, an instrument can be made to operate over a range of, say, 50° starting at 0° or 100° or 450° or at 127° if such a starting point is of advantage in some special case. At the same time the range of adjustment can be 10° or 20° or any small range so that very accurate setting will be possible. Since the temperature controlling means is switched at or about the point of balance of the bridge, it will be seen by reference to FIGURE 5 that with a sensing probe 2 of known characteristics the lowest switching temperature in the range of adjustment is obtained when the resistance of R7 equals the resistance of the sensing probe at that temperature, and the adjustment span will be determined by the maximum resistance of R8. To take full advantage of the foregoing it would be necessary to use a different adjustment resistance R8 and a different graduated scale for every instrument used for a different purpose. This would present considerable problems in quantity manufacture which would be further complicated by the necessity of using both centigrade and Fahrenheit measuring scales. To overcome this difficulty to a large extent the following method is adopted. A few values of R8 are chosen which, in conjunction with characteristics of the sensing resistances chosen, provide adjustment range spans suitable for the majority of purposes and the maximum value of the resistance R7 is chosen which in conjunction with the smallest value of R8 will permit adjustment of the instrument to operate at the maximum temperature within its scope. For example, with one type of resistance probe having a maximum working temperature of 500° C. and a resistance of 22.68 ohms at −200° C. and a resistance of 368.34 ohms at 500° C. R7 is conveniently 370 ohms maximum and three values of R8 are chosen which will produce adjustment range spans of 25° C., 50° and 150° C. or the equivalent Fahrenheit spans of 45° F. and 90° F. and 270° F. It will be noted that the Fahrenheit ranges are divisible by 9 and 5 and the centigrade ranges are divisible by 5 and 5. To cover all the possible requirements it is therefore only necessary to print two types of graduated dial one with 9 major divisions each divided into 5, and the other with 5 major divisions each divided into 5. The first type of scale is used for the Fahrenheit system and the second for the centigrade system of measurement. In each type however each small division will represent a whole number of degrees. The scales are not marked with any numbers until the actual required range of adjustment is known and the lowest required operating temperature of the instrument is fixed by presetting R7, one of the three values of R8 being selected to provide the desired span of adjustment. Examples of scales are shown in FIGURE 6.

The choice of these ranges of temperature simplifies manufacture since standard scales 1C (FIGURES 1 and 3) may be provided for both centigrade and Fahrenheit readings.

What we claim is:

1. A device for sensing temperature comprising a Wheatstone bridge circuit, one resistance of the Wheatstone bridge being disposed in a temperature sensing element, a second resistance of the bridge having an adjustable preset resistance section, a manually adjustable resistance section whereby the bridge may be balanced by manual adjustment at a required temperature within a predetermined range, deviations from the said required temperature unbalancing the bridge so that potentials are set up across the bridge, a relay operable by said potentials, the adjustable preset resistance section in one arm of the bridge being used to vary the predetermined range of temperature over which the device operates and the maximum value of the adjustable preset resistance section being selected at such a value that, taken in conjunction with the minimum value of the manually adjustable resistance, it will permit adjustment of the instrument to operate at the maximum temperature within the predetermined range.

2. A device for sensing temperature according to claim 1, wherein an amplifier is provided to amplify the said potentials to improve the switching operation of the relay, the amplifier including adjustable positive feedback whereby an adjustable differential may be achieved in the operation of the said relay.

3. A device for sensing temperature according to claim 1 wherein the manually adjustable resistance of the bridge comprises a unit which may be remotely located from the rest of the device.

4. A device for sensing temperature according to claim 2 wherein the amplifier comprises a plurality of stages in each of which a pair of transistors are arranged in a balanced push-pull arrangement, the relay being connected in series with the collector of one of the transistors in the last stage.

5. A device for sensing temperature according to claim 4 comprising a potentiometer connected between the bases of the pair of transistors constituting the first stage of the aforesaid amplifier, and a slider for the potentiometer connected to the negative line of the said amplifier via a resistor, the said slider being adjustable to balance or unbalance the said first stage.

6. A device for sensing temperature comprising a Wheatstone bridge circuit, one resistance of the bridge being disposed in a temperature sensing element, a second resistance of the bridge having an adjustable preset resistance section, a manually adjustable resistance section whereby the bridge may be balanced by manual adjustment at a required temperature within a predetermined range, deviations from the required temperature unbalancing the bridge so that potentials are set up across the bridge, two similar amplifiers operable by the said potentials each amplifier comprising a plurality of stages in each of which pairs of transistors are arranged in balanced push-pull, a relay operable by each amplifier, adjustable positive feed-back for each amplifier whereby an adjustable differential may be achieved in the operation of each relay, and a potentiometer connected between the bases of the pair of transistors of the first stage of each amplifier, the potentiometers being adjustable so that the first stage of one amplifier may be balanced and the balance of the first stage of the other amplifier upset, thereby causing their respective relays to operate at different temperatures.

References Cited in the file of this patent
UNITED STATES PATENTS

| | | |
|---|---|---|
| 2,540,728 | Hansen | Feb. 6, 1951 |
| 2,680,215 | Mershon | June 1, 1954 |
| 2,860,298 | Carlson | Nov. 11, 1958 |
| 2,863,008 | Keonjian | Dec. 1, 1958 |
| 2,909,623 | Blecher | Oct. 20, 1959 |
| 2,935,261 | Smith | May 3, 1960 |
| 2,954,530 | Haskell | Sept. 27, 1960 |
| 2,967,982 | Dubbelman | Jan. 10, 1961 |
| 3,062,941 | White | Nov. 6, 1962 |